(12) United States Patent
Jung

(10) Patent No.: US 7,941,641 B1
(45) Date of Patent: May 10, 2011

(54) RETARGETABLE INSTRUCTION DECODER FOR A COMPUTER PROCESSOR

(76) Inventor: Yong-Kyu Jung, College Station, TX (US)

( * ) Notice: Subject to any disclaimer, the term of this patent is extended or adjusted under 35 U.S.C. 154(b) by 578 days.

(21) Appl. No.: 11/865,624

(22) Filed: Oct. 1, 2007

(51) Int. Cl.
G06F 9/30 (2006.01)
(52) U.S. Cl. .................................................... 712/209
(58) Field of Classification Search .................. None
See application file for complete search history.

(56) References Cited

U.S. PATENT DOCUMENTS

| | | | |
|---|---|---|---|
| 4,992,933 A * | 2/1991 | Taylor | 712/22 |
| 5,053,952 A | 10/1991 | Koopman, Jr. et al. | 712/248 |
| 5,404,555 A | 4/1995 | Liu | 712/36 |
| 5,652,852 A | 7/1997 | Yokota | 712/208 |
| 6,182,206 B1 | 1/2001 | Baxter | 712/43 |
| 6,691,306 B1 * | 2/2004 | Cohen et al. | 717/139 |
| 6,948,158 B2 | 9/2005 | Van Gageldonk et al. | 717/140 |
| 7,130,966 B2 | 10/2006 | Solomon et al. | 711/125 |
| 7,181,596 B2 | 2/2007 | Henry et al. | 712/209 |
| 7,191,314 B2 | 3/2007 | Pappalardo et al. | 712/208 |
| 7,191,350 B2 | 3/2007 | Tani | 713/324 |
| 7,213,130 B2 | 5/2007 | Teruyama | 712/218 |
| 7,216,220 B2 | 5/2007 | Brown et al. | 712/242 |
| 7,251,811 B2 | 7/2007 | Rosner et al. | 717/138 |
| 2002/0019976 A1 * | 2/2002 | Patel et al. | 717/137 |
| 2004/0162964 A1 * | 8/2004 | Ota et al. | 712/200 |
| 2005/0172105 A1 * | 8/2005 | Doering et al. | 712/36 |

OTHER PUBLICATIONS

Foldoc, "Cache". 2 pages. Jun. 25, 1997. Obtained via http://foldoc.org/cache.*

* cited by examiner

Primary Examiner — Robert Fennema
(74) Attorney, Agent, or Firm — Baker Botts L.L.P.

(57) ABSTRACT

According to one embodiment, an instruction decoder for a computer processor includes a fixed instruction decoding portion and at least one look up table having a plurality of random access memory elements. The fixed instruction decoding portion has an input for receiving program instructions and an output coupled to a back-end processing engine. The instruction decoder is selectively operable to alternatively decode program instructions associated with a differing instruction set architectures by storage of logical values in the at least one look up table. Decoding of program instructions from one particular instruction set architecture are accomplished using the same logic gates as program instructions form other instruction set architectures.

29 Claims, 4 Drawing Sheets

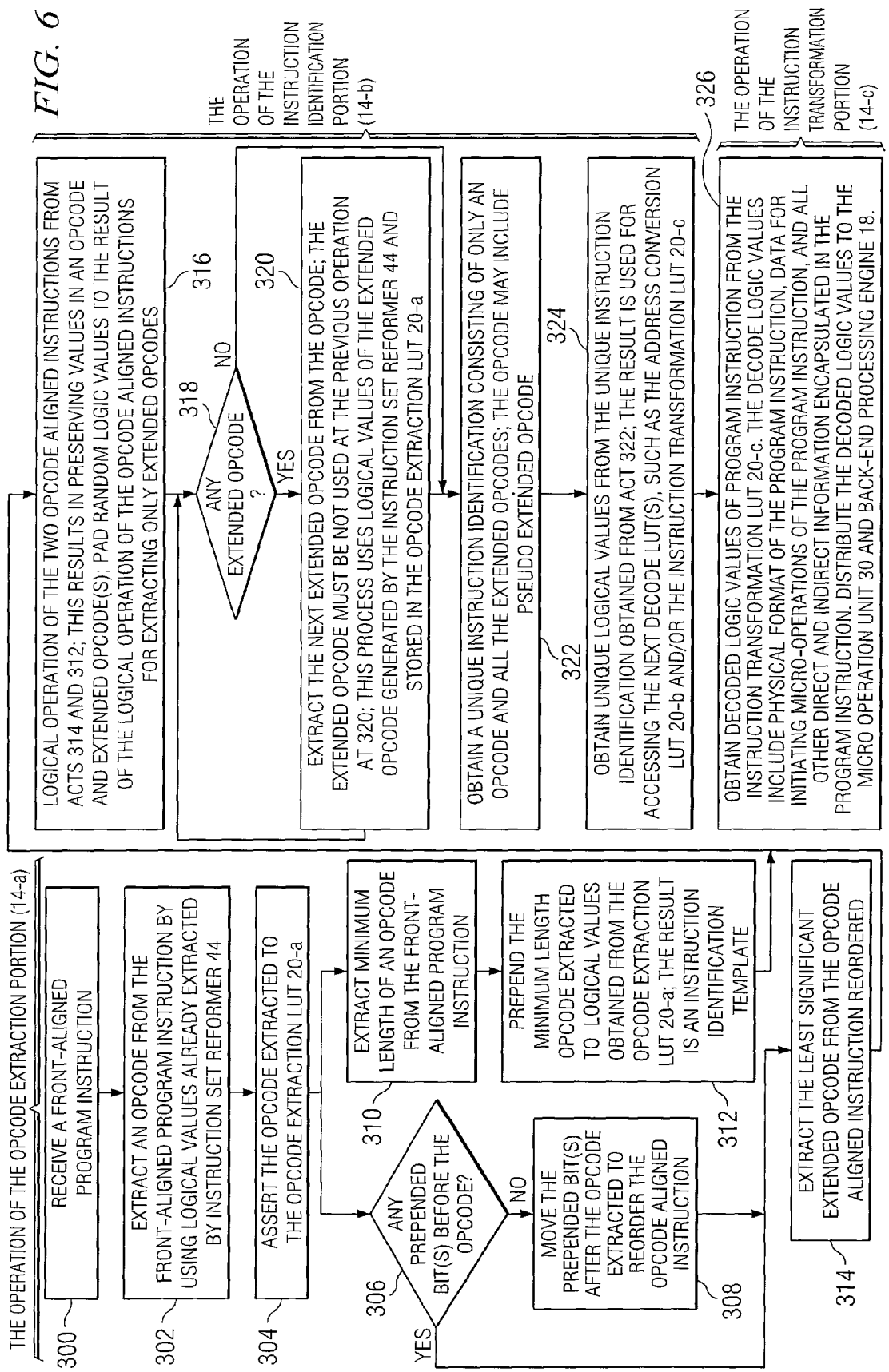

RETARGETABLE INSTRUCTION DECODER FOR A COMPUTER PROCESSOR

TECHNICAL FIELD OF THE DISCLOSURE

This disclosure generally relates to computer processors, and more particularly, to a retargetable instruction decoder for a computer processor and a method of operating the same.

BACKGROUND OF THE DISCLOSURE

Many computing systems incorporate computer processors that execute various functions according to a sequence of opcodes (e.g. operational codes) stored in a memory. Computer processors of this type may be generally referred to as Von Neumann-based processors. Computing systems implementing these computer processors may be relatively flexible in that the computing system's behavior may be modified by changing the sequence of instructions through which the computing system operates. Each instruction may include data and an opcode that is decoded by the computer processor for provided various functions using this data. Instructions and their associated opcodes executed by any particular Von Neumann-based processor may be collectively referred to as an instruction set.

SUMMARY OF THE DISCLOSURE

According to one embodiment, an instruction decoder for a computer processor includes a fixed instruction decoding portion and at least one look up table having a plurality of random access memory elements. The fixed instruction decoding portion has an input for receiving program instructions and an output coupled to a back-end processing engine. The instruction decoder is selectively operable to alternatively decode program instructions associated with differing instruction set architectures by storage of logical values in the at least one look up table. Decoding of program instructions from one particular instruction set architecture is accomplished using the same logic gates as program instructions form other instruction set architectures.

Some embodiments of the disclosure provide numerous technical advantages. Some embodiments may benefit from some, none, or all of these advantages. For example, according to one embodiment, the retargetable instruction decoder may provide adaptive retargeting of its instruction set architecture with relatively fewer physical logic gates than known reconfigurable instruction decoders. The use of relatively fewer logic gates may reduce latency time for decoding program instructions that may in turn, enable a faster speed of operation in certain embodiments.

According to another embodiment, the retargetable instruction decoder may provide encapsulation of several program instructions from a source instruction set architecture to relatively fewer program instructions. Using this feature, functionality of the program instructions may be maintained while reducing external read and write operations from the computer processor.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description.

BRIEF DESCRIPTION OF THE DRAWINGS

A more complete understanding of embodiments of the disclosure will be apparent from the detailed description taken in conjunction with the accompanying drawings in which:

FIG. 6 is a flowchart showing one embodiment of a series of actions that may be performed by the targetable instruction decoder of FIG. 1.

DETAILED DESCRIPTION OF EXAMPLE EMBODIMENTS

The flexibility of computing systems incorporating Von Neumann-based processors have provided relatively flexible modification of its behavior. To keep pace with enhancements in technology, software written according to particular instruction set architectures have been shown to double every ten months. Integration density of computer processors however, has been shown to double approximately every eighteen months. This trend has created a relatively large gap between processors and the software that is executed on these processors. Traditional Von Neumann-based processors may possess inherent problems with instruction rebinding efficiency and memory usage for post-fabrication modification of processors. Post-fabrication modification generally refers to modification of the instruction set architecture of a computer processor following its manufacture. If these trends continue, traditional Von Nuemann-based processors may not be able to keep pace with enhancements in technology.

For example, the sum of absolute difference (SAD) operation is frequently used by various video compression standards, such as the motion picture experts group, version 4 (MPEG-4) video compression algorithm. This computationally intensive algorithm, which normally takes up to 70% of the total MPEG-4 encoding process, has been implemented in various forms. For example, when the sum of absolute difference algorithm is implemented on some digital signal processors (DSPs), kernel processing can be implemented with iterative parallel/serial arithmetic logic unit (ALU) operations. These known digital signal processors however, may not have a "sum of absolute difference" instruction. In many cases, this key instruction may not have been because it would have been too costly to insert another instruction following its fabrication. Thus, post-fabrication modification of many processors using the traditional Von Neumann-based architecture may be relatively difficult to implement using known technologies.

Post-fabrication instruction binding has been achieved somewhat using instruction decoders implemented with field programmable gate arrays (FPGAs). These field programmable gate arrays have a number of logic gates that provide dynamic decoding of program instructions based upon alternatively selecting various paths through a number of logic gates. This approach however, uses a relatively large number of alternatively selectable logic gates that may be relatively slow. Thus, the performance of processors having instruction decoders implemented with field programmable gate arrays may not be adequate for some applications.

Figure 1:
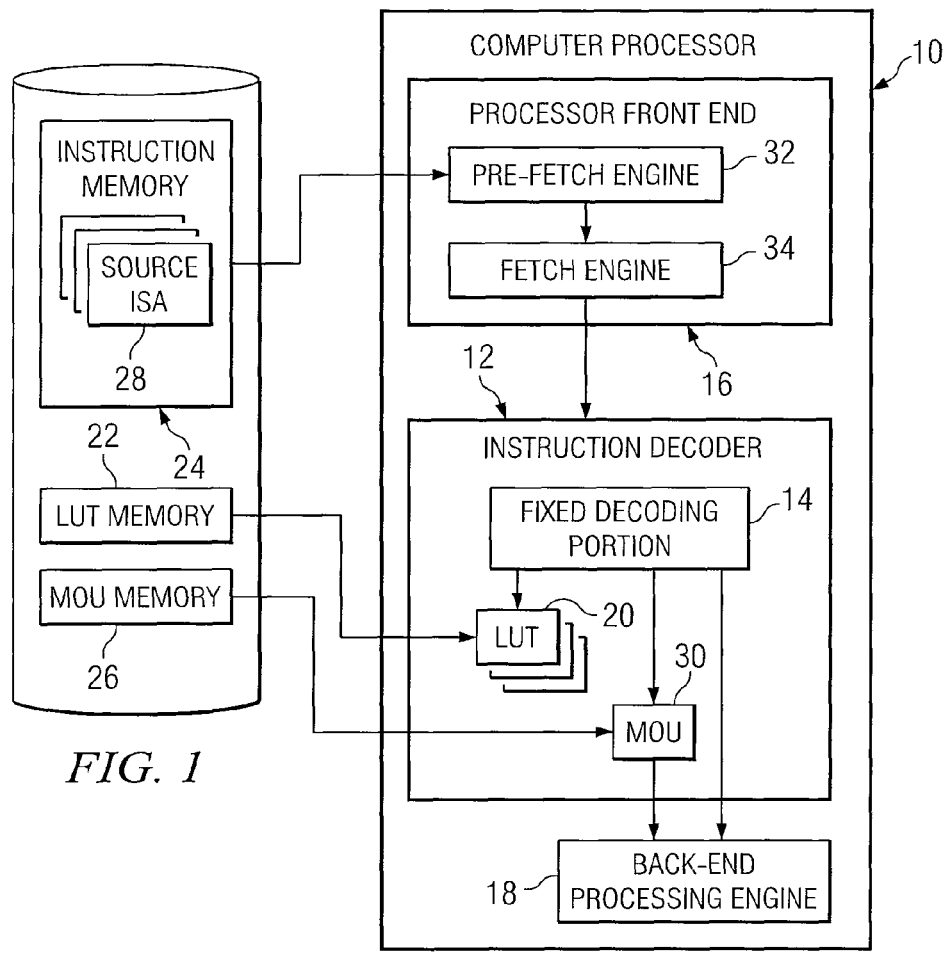
FIG. 1 is a diagram showing one embodiment of a computer processor that may be implemented with a retargetable instruction decoder according to the teachings of the present disclosure.

FIG. 1 is one embodiment of a computer processor 10 that may implement a retargetable instruction decoder 12 for solving the previously described problems as well as other problems. The retargetable instruction decoder 12 includes a fixed decoding portion 14 having an input for receiving program instructions from a processor front end 16 and an output coupled to a back-end processing engine 18. According to the teachings of the present disclosure, the retargetable instruction decoder 12 may have one or more look up tables (LUTs) 20 that may store various logical values from a look up table memory 22 for alternatively decoding program instructions from an instruction memory 24. The instruction memory 24 may include program instructions associated with one or more source instruction set architectures 28. Thus, the retargetable instruction decoder 12 may be operable to alternatively execute program instructions from one or more different source instruction set architectures according to logical values stored in the look up tables 20.

Although instruction decoder is described in this particular embodiment as having one or more look up tables 20, it should be appreciated that any type of device having a number of memory elements that store various logical values for alternatively decoding program instructions from differing instruction set architectures (ISAs) may be a suitable substitute.

In one embodiment, a micro operation unit (MOU) memory 26 may be provided that stores micro-operations used by a micro-operation unit memory 30. Micro-operations may refer to a particular portion of a program instruction that is decoded by an instruction decoder for performing a certain specified function or task. Thus, the micro-operations may include information for performing any number of suitable functions of computer processor 10. As will be described in greater detail below, these micro operations may be coordinated with program instructions for providing various functions of the computer processor 10.

The retargetable instruction decoder 12 may decode program instructions from differing source instruction set architectures 28 through the same plurality of logic gates. That is, the retargetable instruction decoder 12 may be configured at run-time to execute program instructions from differing source instruction set architectures 28 without alternatively switching among differing logic gates as is commonly performed using field programmable gate arrays (FPGAs). Known field programmable gate array-based instruction decoders change physical connections and/or paths between logic gates in order to modify their behavior. Known reconfigurable instruction decoders using field programmable gate arrays provide post-fabrication rebinding software that is commonly referred to as configware and flowware. These known instruction decoders however, have a relatively large overhead of physical layout and thus delay time due to the relatively large quantity of logic gates inherent in their design. The retargetable instruction decoder 12 of the present disclosure, however, may provide a solution to this problem by implementing one or more look up tables 20 that store various logical values for alternatively decoding program instructions from different source instruction set architectures 28 using a single physical path.

The retargetable instruction decoder 12 may formed from any suitable semiconductor manufacturing process incorporating fixed logic circuitry and memory components that is formed as a portion of or independent from a computer processor. In one embodiment, the retargetable instruction decoder 12 may be provided as an application specific integrated circuit (ASIC) for instantaneous post-fabrication instruction binding. This means that there are no physical connection and/or paths changes in hardware by the retargetable instruction decoder 12 for decoding of program instructions from differing source instruction set architectures 28.

Certain embodiments of a retargetable instruction decoder 12 having one or more look up tables 20 may provide an advantage in that a broad range of post-fabrication adaptable functions may be provided. For example, the retargetable instruction decoder 12 may enable function encapsulation and decapsulation (FED) for various functions performed by the computer processor 10. Function encapsulation and decapsulation may significantly extend instantaneous customization capability by encapsulating multiple instructions to a condensed instruction before run-time and executing the condensed instruction at run-time through a decapsulation process. Thus, the retargetable instruction decoder 12 may provide one approach for rebinding various scales of operations in software as condensed instructions to the back-end processing engine 18.

In one embodiment, the processor front end 16 may include a fetch engine 34 for converting unaligned fixed bit length program instructions that may be read from instruction memory 24 by the prefetch engine 32 or by the fetch engine 34 itself to front-aligned binary program instructions. The front-aligned binary program instructions may enable retargetable instruction decoder 12 to implement a pipeline architecture as described in detail below.

The back-end processing engine 18 may include any suitable device that performs one or more functions of the computer processor. Examples of various devices that may perform these functions include source/destination registers, memory address registers, arithmetic logic units (ALUs), input/output (I/O) ports, and analog to digital (ADC) converters.

Figure 2:
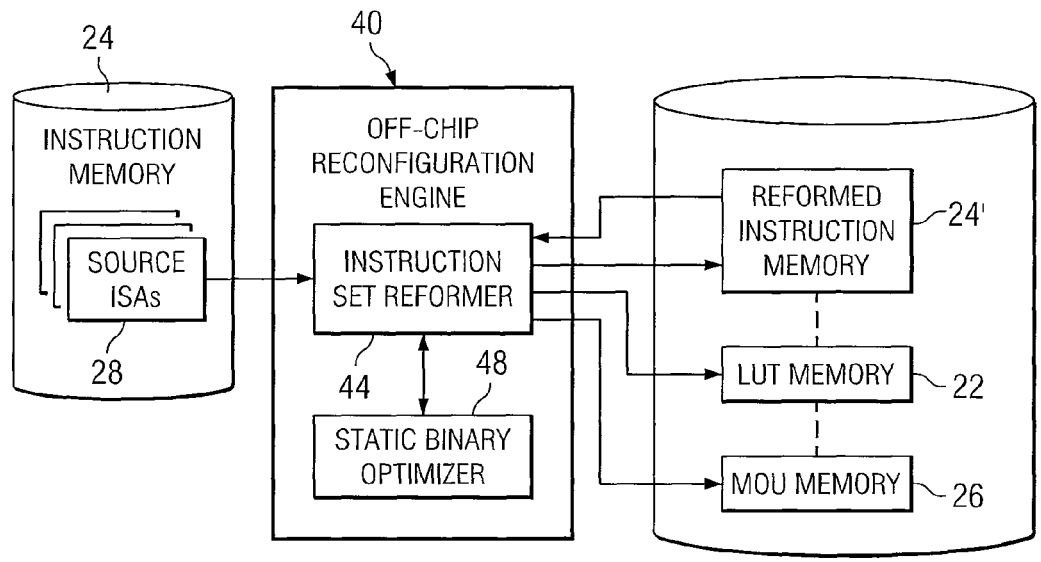
FIG. 2 is a diagram showing one embodiment of an off-chip reconfiguration engine that may be used with the computer processor of FIG. 1.

FIG. 2 shows one embodiment of an off-chip reconfiguration engine 40 that may be used to generate reformed program instructions for use by retargetable instruction decoder 12 and store these reformed program instructions in a reformed instruction memory 24'. The off-chip reconfiguration engine 40 may also generate logical values for storage in a look up table memory 22 and micro operation unit memory 26, respectively, for use by used by retargetable instruction decoder 12. The off-chip reconfiguration engine 40 may be implemented in any suitable manner. In one embodiment, the off-chip reconfiguration engine 40 may be implemented as a software program that may be executed on any suitable computing system executing instructions stored in a memory. In another embodiment, the off-chip reconfiguration engine 40 may be implemented in physical logic circuitry. The off-chip reconfiguration engine 40 has an instruction set reformer 44 that may be operable to convert program instructions from one or more source instruction set architectures 28 into reformed program instructions suitable for use by computer processor 10.

Instruction set reformer 44 may be operable to generate logical values that are stored in one or more look up tables 20 and micro operation unit 30 coupled to back-end processing engine 18. In one embodiment, instruction set reformer 44 may associate similar program instructions from differing instruction set architectures to the same look up table values. In this manner, decoding latency of the retargetable instruction decoder 12 may be reduced by a corresponding reduction in read or write operations to or from the look up tables 20, respectively. That is, instruction set reformer 44 may increase retargetable instruction decoder 12 bandwidth by managing the quantity and thus complexity of look up table memory 22 and/or micro operation unit (MOU) memory 26 in some embodiments.

Off-chip reconfiguration engine 40 may be executed at any suitable time prior to execution of the retargetable instruction decoder 12 on the computer processor 10. In one embodiment, off-chip reconfiguration engine 40 may be executed at load-time. That is, reconfiguration of the source instruction set architecture 28 may be performed when the program instructions are loaded into memory. During execution, instruction set reformer 44 may perform a static binary translation of program instructions to opcodes suitable for use by retargetable instruction decoder 12 and store these translated opcodes and their associated operands in reformed instruction memory 24. Micro-operations associated with translated opcodes may be generated and stored in the micro operation unit memory 26. These micro-operations may include information used by the back-end processing engine 18 for performing one or more functions as described above. The instruction set reformer 44 may also generate logical values for dynamic reconfiguration during run-time using look up tables 20 and micro operation unit 30 and store these values in the look up table memory 22 micro operation unit memory 26, respectively. In one embodiment, the instruction set reformer 44 may be operable to reconfigure reformed program instructions in reformed instruction memory 24' to be front-end aligned. Front-end alignment of instructions may enable a pipeline type architecture for retargetable instruction decoder 12.

In one embodiment, instruction set reformer 44 may be operable to read the program instructions to determine if any reconfigured program instructions possess a similar syntactic structure. If any such instructions are found, the instruction set reformer 44 may associate the program instruction with existing look up table values stored in the look up table memory 22. In this manner, retargetable instruction decoder 12 may provide enhanced performance by reducing dynamic reconfiguration for differing instruction sets processed during run-time in some embodiments.

In one embodiment, off-chip reconfiguration engine 40 may also include a static binary optimizer 48 that encapsulates multiple program instructions, such as instructions in a loop or a subroutine, in fewer program instructions or a single program instruction, while mapped to the same sequences of the micro operations required for the instructions encapsulated. In another embodiment, the static binary optimizer 48 may be operable to schedule micro operations performed by micro operation unit 30 for enhanced parallelism. The micro operation unit 30 may be a single unified and/or distributed re-writeable random access memory element depending on the architecture of the back-end processing engine 18. Back-end processing engine 18 may be a single or a multiple homogeneous or heterogeneous pipelined reduced instruction set computer (RISC), complex instruction set computer (CISC), super-scalar processor, very long instruction word (VLIW) processor, or any combination of computer architectures including hardware accelerators in field programmable gate arrays and/or application specific integrated circuits. As a result, these instructions may be linked to the proper micro operations scheduled with concurrent micro operations. Consequently, relatively more concurrent micro operations may be executed for reduced latency for differing functions may be processed in a parallel manner by back-end processing engine 18.

Figure 3:
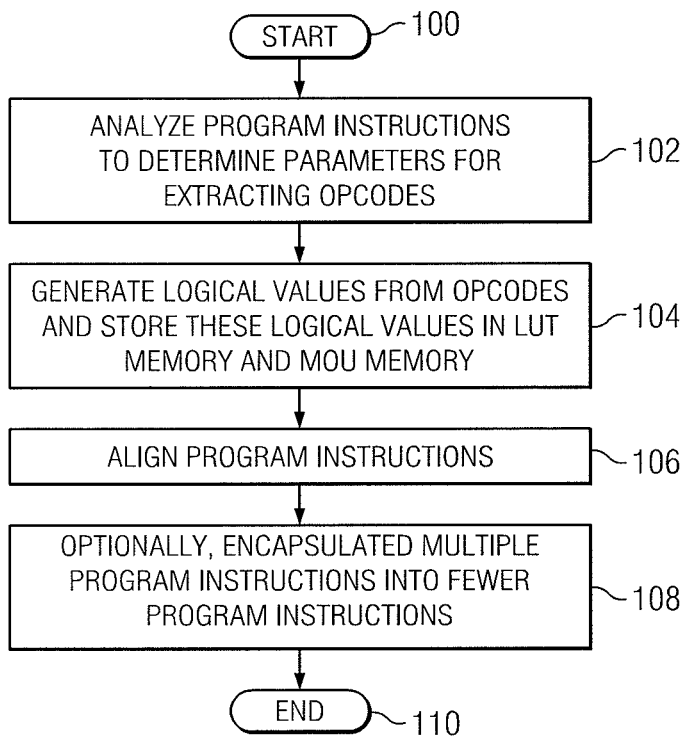
FIG. 3 is a flowchart showing one embodiment of a series of actions that may be performed by the off-chip reconfiguration engine to reform program instructions used by the retargetable instruction decoder of FIG. 1.

FIG. 3 shows one embodiment of a series of actions that may be performed by the off-chip reconfiguration engine 40. In act 100, the off-chip reconfiguration engine 40 is initiated. The off-chip reconfiguration engine 40 may be initiated by launching off-chip reconfiguration engine 40 on a suitable computing system if the off-chip reconfiguration engine 40 is implemented as in software or initializing a hardware structure that implements the off-chip reconfiguration engine 40.

In act 102, the off-chip reconfiguration engine 40 may analyze the program instructions from the source instruction set architecture to determine reformation parameters for extracting the opcodes from their associated program instructions. In one embodiment, off-chip reconfiguration engine 40 may also analyze program instructions stored in reformed instruction memory 24' such that the opcodes of similar program instructions may be associated with opcodes of other program instructions from differing instruction set architectures to the same look up table values.

In act 104, the off-chip reconfiguration engine 40 may generate logical values from the extracted opcodes and micro operations and store these logical values in the look up table memory 22 and micro-operation unit memory 26. The logical values used in the micro operation unit 30 may be obtained from the architecture of the back-end processing engine 18. In one embodiment, the off-chip reconfiguration engine 40 may generate these logical values by composing pseudo extended opcodes for aligning the extracted opcodes and other single or multiple extended opcodes in each instruction in the target instruction set. Next, the off-chip reconfiguration engine 40 may align the extracted opcodes by appending the pseudo opcodes to each program instruction in the reformed instruction memory 24' and extracting all the extended opcode fields from each instruction and by obtaining the bit-location and the bit-length of the extended opcodes. The logical values may be generated by appending the extended opcodes to the aligned opcodes In act 106, the off-chip reconfiguration engine 40 may align the program instructions for use by retargetable instruction decoder 12 having a pipelined architecture. In one embodiment, the off-chip reconfiguration engine 40 may align the program instructions by padding 'zeros' to the logical values for making the same bit-length instructions of all the instructions in the reformed instruction memory 24'.

In act 108, the off-chip reconfiguration engine 40 may encapsulate multiple program instructions from instruction memory 24 into relatively fewer program instructions using static binary optimizer 48.

In act 110, reformation of the program instruction by the off-chip reconfiguration engine 40 is complete and the reformed program instructions stored in reformed instruction memory 24' may be used by retargetable instruction decoder 12.

Figure 4:
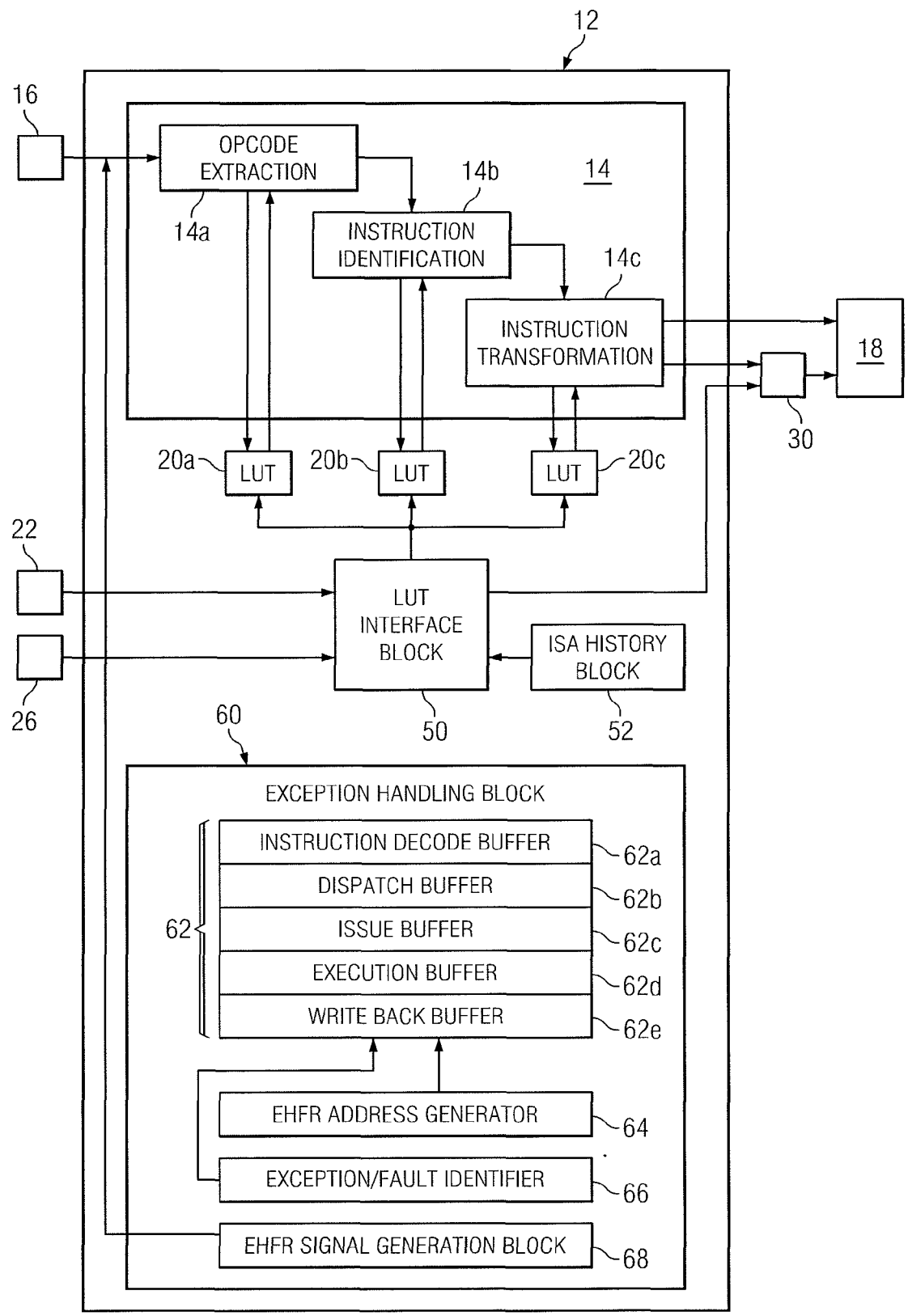
FIG. 4 is a diagram showing several components of the retargetable instruction decoder of FIG. 1.

FIG. 4 shows one embodiment of the retargetable instruction decoder 12 having a fixed decoding portion 14 that is coupled with one or more look up tables 20 for dynamic decoding of program instructions from instruction memory 24. In this particular embodiment, fixed decoding portion 14 is a multiple stage, super-pipeline decoding portion having an opcode extraction logic portion 14a, an instruction identification portion 14b, and an instruction transformation portion 14c. It should be appreciated however, that fixed decoding portion 14 may also be implemented with a single fixed decoding stage if a pipelined architecture is not needed or desired. The super-pipelined retargetable instruction decoder 12 may provide a relatively higher clock speed and a relatively lower power usage by reducing the size of look up tables 20 and micro-operation unit 30 than a single stage retargetable instruction decoder 12 in certain embodiments.

The opcode extraction logic portion 14a, instruction identification portion 14b, and instruction transformation portion 14c are each coupled to an opcode extraction look up table 20a, an address conversion look up table 20b, and an instruction transformation look up table 20c, respectively. The opcode extraction logic portion 14a, instruction identification portion 14b, and instruction transformation portion 14c process program instructions through their associated look up tables 20a, 20b, and 20c. These Look up tables 20a, 20b, and 20c accommodate reference information and intermediate decoding results that initiate the next decoding process for generating the final decodes outputs. These outputs may be coordinated with micro operations stored in micro operation unit 30 for providing various functions specified in the opcode portion of the program instruction on the back-end processing engine 18. The opcode extraction look up table 20a, address conversion look up table 20b, and instruction transformation look up table 20c may store logical values for decoding program instructions.

A look up table interface block 50 provides physical connections between the look up table memory 22 and look up tables 20. Look up table interface block 50 may also provide control signals and/or micro-operation/code sequences of the instructions defined in the different instruction set architectures 28 for use by back-end processing engine 18 to micro operation 30 by providing physical connections between the micro operation memory and micro operation unit 30. The look up table interface block 50 is operable to download at least one set of logical values for storage in look up tables 20. Logical values may be downloaded for other instruction set architectures, as long as sufficient memory space in the look up tables 20a, 20b, and 20c are available.

The look up table interface block 50 may be coupled to an instruction set architecture history block 52 that stores existing instruction-set reformation codes of the different instruction-sets to prevent instruction-set reformation code of the same instruction-set from being downloaded multiple times from look up table memory 22. In one embodiment, the instruction set architecture history block 52 may manage various replacement policies, such as least recently used (LRU) or least frequently used (LFU) policies of the look up tables 20. The instruction set architecture history block 52 may also select a particular retargeting mode, such as instruction-set merging, function encapsulation, instruction-set switching, and instruction-set downloading. The instruction set architecture history block 52 may also enable switching to another retargeting mode and generate other retargeting signals for dynamically initiating the retargeting operation of the selected mode.

The retargetable instruction decoder 12 may also include an exception handling block 60 for handling various recovery operations of the computer processor 10. In one embodiment, exception handling block 60 includes a number of exception handling fault recovery (EHFR) buffers 62, such as an instruction decode buffer 62a, an instruction dispatch buffer 62b, an instruction issue buffer 62c, an execution buffer 62d, and a write back buffer 62e. The instructions stored in the exception handling fault recovery buffers 62 may be used to process the exceptions or recover from faults that are detected in the retargetable instruction decoder 12, back-end processing engine 18, or other portion of the computer processor 10. The exception handling block 60 may include other exception handling fault recovery hardware, such as an exception handling fault recovery address generator 64, an exception/fault identifier 66, and exception handling fault recovery signal generation block 68.

The instruction decode buffer 62a stores a program instruction decoded in the fixed decoding portion 14. In one embodiment, an internal fault recovery mode and an external fault recovery mode may be provided. In the external fault recovery mode, the retargetable instruction decoder 12 prefetches and fetches program instructions from reformed instruction memory 24 through the instruction prefetch engine 32 and the instruction fetch engine 34. In internal fault recovery mode, the retargetable instruction decoder 12 directly accesses the instructions from the exception handling fault recovery buffer 62. The byte-aligned instruction memory address for prefetching the instructions is computed by exception handling fault recovery address generator 64.

The exception/fault identifier 66 identifies which stage reported one or more recoverable exceptions and/or faults. This identifier determines the most remote stage from retargetable instruction decoder 12 that had the one or more exceptions or faults if multiple exception handling fault recovery signals arrive at the same time. The exception/fault identifier 66 also delivers the identification result (i.e., recoverable or not) and the particular fault recovery mode to the exception handling fault recovery signal generation block 68 to initiate new exception handling fault recovery process. The exception handling fault recovery signal generation block 68 generates control signals of the exception handling fault recovery process.

Figure 5:
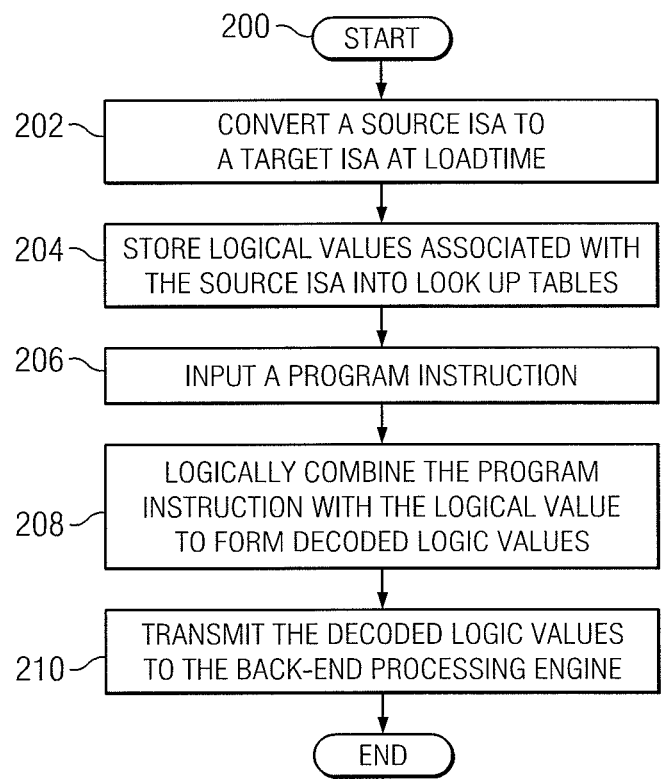
FIG. 5 is a flowchart showing a series of actions that may be performed by the computer processor and off-chip reconfiguration engine of FIGS. 1 and 2.

FIG. 5 is a flowchart showing one embodiment of a series of actions that may be performed by the retargetable instruction decoder 12 configured on a computer processor 10 to process program instructions from multiple source instruction set architectures. In act 200, the process is initiated. The process may be initiated by applying electrical power to the computer processor 10 and performing any suitable bootstrapping operations.

In act 202, an off-chip reconfiguration engine 40 may provided to convert a source instruction set architecture to a target instruction set architecture that is used by the retargetable instruction decoder 12. The target instruction set architecture may include a number of logical values for storage in at least one look up table 20 and a number of micro-operations for storage in micro operation unit 30 coupled to the back-end processing engine 18. During operation, the back-end processing engine 18 may be responsive to the micro-operations for performing its various functions. In one embodiment, the off-chip reconfiguration engine 40 may also be operable to combine several program instructions from the source instruction set architecture into a single target instruction including the micro-operations from each of its constituent program instructions. Act 202 may be performed before run-time of the computer processor 10.

In act 204, the retargetable instruction decoder 12 may store logical values of the target instruction set architecture into its at least one look up table 20. In one embodiment, look up table interface block 50 may compare the logical values with other values stored in the same instruction set architecture history block 62 to prevent multiple downloading of the same logical values into the at least one look up table.

In act 206, the retargetable instruction decoder 12 may receive a program instruction. In one embodiment, the retargetable instruction decoder 12 is a pipelined instruction decoder having multiple stages (e.g. opcode extraction portion 14a, instruction identification portion 14b, and instruction transformation portion 14c) for processing the program instruction. Similarly to the single stage instruction decoder, the program instruction may be aligned by a processor front end 16 coupled to the input of the retargetable instruction decoder 12.

In act 208, the retargetable instruction decoder 12 may logically combine the received program instruction with the logical values stored in the at least one look up table 20 in order to identify the program instruction and generate decoded logic values for use by the back-end processing engine 18. The term "logically combine" may refer to in this disclosure as the act of combining logical information provided in the received program instruction and logical values stored in the at least one look up table 20 through same physical paths in which other received program instructions and logical values may be combined. That is, the retargetable instruction decoder 12 may identify and decode the program instruction without selecting one or more alternative paths through a matrix of physical logic gates as is commonly performed by field programmable gate array circuitry.

In act 210, the retargetable instruction decoder 12 may transmit the decoded logic values to the micro operation unit 30 and back-end processing engine 18. The back-end processing engine 18 may be responsive to the decoded logic values including the micro operations stored in micro operation unit 30 to perform various functions specified by the target instruction. In one embodiment, back-end processing engine 18 may perform these various functions according to a plurality of micro-operations generated and stored in micro operation unit 30 in act 202.

Acts 202 through 210 may be repeatedly performed for each of a sequence of program instructions from an executable program stored in a memory. The retargetable instruction decoder 12 may decode program instructions from another instruction set architecture by writing new logical values in the at least one look up table 20 associated with the other instruction set architecture. Thereafter, program instructions associated with the other instruction set architecture may be decoded and transmitted to the back-end processing engine 18.

FIG. 6 is a flowchart showing one embodiment of a series of actions that may be performed by retargetable instruction decoder 12. In act 300, the retargetable instruction decoder 12 may receive program instructions from processor front end 16. In one embodiment in which retargetable instruction decoder 12 has a pipelined architecture, the retargetable instruction decoder 12 may receive program instructions as a front-aligned instruction stream.

In act 302, the opcode extraction portion 14a and opcode extraction look up table 20a may extract an opcode from each program instruction from the program instruction stream. In one embodiment, the opcode extraction portion 14a may use logical values already extracted by instruction set reformer 44.

In act 304, the opcode extraction look up table 20a may then assert the extracted opcode to the opcode extraction look up table 20a.

In act 306, the extracted opcode look up table 20a may check whether any prepended bits are included before the opcode and move any existing prepended bits after the opcode to reorder the opcode aligned program instruction based upon the logical values stored in opcode extraction look up table 20a in act 308.

In act 310, the opcode extraction look up table 20a may extract the minimum length of the opcode and prepend the minimum length opcode to the logical values obtained from the opcode extraction look up table 20a.

In act 312, an instruction identification template is obtained.

In act 314, the opcode extraction portion 14a may then extract the least significant extended opcode from the opcode aligned program instruction reordered.

In act 316, the instruction identification portion 14b may perform a logical operation of the output from act 314 and act 314.

In act 318, the instruction identification portion 14b may verify the existence of any extended opcodes. If an extended opcode is found, the instruction identification portion 14b may then extract the closest extended opcode that may be not used at the previous operation in act 320. This extended opcode extraction operation in act 320 may use logical values of the extended opcode generated by instruction set reformer 44 and stored in the opcode extraction look up table 20a.

In act 322, the instruction identification portion 14b may then obtain the opcode portion of the program instruction including only the opcode and any associated extended opcode. In act 324, the instruction identification portion 14b may obtain logical values from the opcode obtained in act 322.

In act 326, the instruction transformation portion 14c may generate decode logic values obtained that are derived from logical values from act 324. The decoded logic values may include physical format of the program instruction, data for initiating micro operations of the program instruction, and other direct and indirect information encapsulated in the program instruction. The instruction transformation portion 14c may then distribute these decoded logic values to the micro operation unit 30 and back-end processing engine 18.

A retargetable instruction decoder 12 for a computer processor 10 has been described that may provide execution of program instructions from differing instruction set architectures. The retargetable instruction decoder 12 may also provide a static reconfiguration engine 40 that combines several program instructions into a single program instruction for reduction in bus overhead and thus, elapsed time and energy consumption to execute these program instructions. The off-chip reconfiguration engine 40 may reconfigure program instruction prior to execution on computer processor 10. Certain embodiments of the retargetable instruction decoder 12 may reduce or alleviate the gap between processors and the software that is executed on these processors described above by providing modification to instruction set architecture of the computer processor 10 after fabrication. That is, the behavior and/or characteristics of the computer processor implemented with retargetable instruction decoder 12 may be modified following its development cycle to keep pace with advancements in technology.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

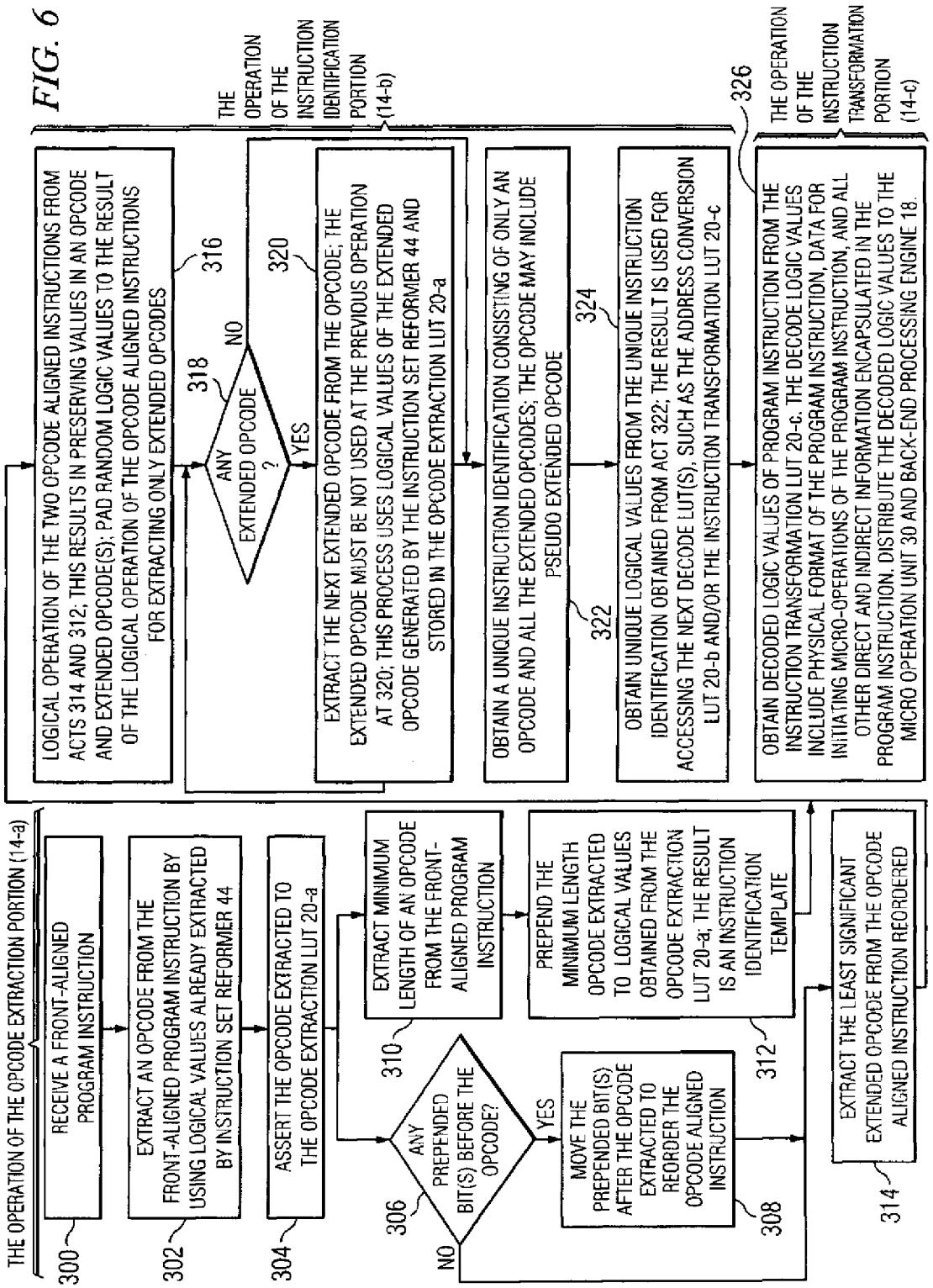

What is claimed is:

1. A computer processor comprising:
an instruction decoder having a plurality of random access memory elements and a fixed instruction decoding portion, the fixed instruction decoding portion having an input for receiving program instructions and an output coupled to a back-end processing engine configured to function according to a target instruction set architecture, the instruction decoder being internal to the computer processor and operable to:
store a first set of logical values for decoding a first set of program instructions in the plurality of random access memory elements, the first set of program instructions being associated with a first instruction set architecture, the first set of logical values generated from:
a first set of operational codes generated from the first set of program instructions; and
a first set of micro-operations generated from the first set of operational codes;
receive a first program instruction associated with the first instruction set architecture from an instruction memory;
decode the first program instruction by logically combining a particular one of the first set of logical values with the first program instruction to form a first decoded logic value associated with the target instruction set architecture, the first decoded logic value indicating a decoded output of the first program instruction;
transmit the first decoded logic value to the back-end processing engine;
store a second set of logical values for decoding a second set of program instructions in the plurality of random access memory elements, the second set of program instructions being associated with a second instruction set architecture, the second instruction set architecture being different from the first instruction set architecture, the second set of logical values generated from:
a second set of operational codes generated from the second set of program instructions; and
a second set of micro-operations generated from the second set of operational codes;
receive a second program instruction associated with the second instruction set architecture from an instruction memory;
decode the second program instruction by logically combining a particular one of the second set of logical values with the second program instruction to form a second decoded logic value associated with the target instruction set architecture, the second decoded logic value indicating a decoded output of the second program instruction; and
transmit the second decoded logic value to the back-end processing engine;
wherein the first and second sets of logical values are generated before execution of the computer processor by a reconfiguration engine that is separate from the computer processor;
wherein the first and second sets of logical values are operable to allow the instruction decoder to alternatively decode the first program instruction from the first instruction set architecture and the second program instruction from the second instruction set architecture using a single physical path in the computer processor; and
wherein the first and second sets of logical values are generated by:
determining a plurality of opcodes from the first and second sets of program instructions;
determining bit-locations of the determined plurality of opcodes;
determining bit-lengths of the determined plurality of opcodes;
composing a plurality of pseudo opcodes;
determining a plurality of extended opcodes from the first and second sets of program instructions;
determining extended opcode fields from the first and second sets of program instructions;
determining bit-locations of the determined plurality of extended opcodes;
determining bit-lengths of the determined plurality of extended opcodes;
generating aligned opcodes using the plurality of pseudo opcodes, the determined bit-locations, and the determined bit-lengths; and
generating the first and second sets of logical values using the determined extended opcodes and the aligned opcodes.

2. The computer processor of claim 1, wherein the plurality of random access memory elements is a portion of at least one look up table.

3. The computer processor of claim 2, wherein the at least one look up table comprises three look up tables and the fixed instruction decoding portion comprises an opcode extraction portion, an instruction identification portion, and an instruction transformation portion that are each associated with one of the three look up tables.

4. The computer processor of claim 3, wherein the instruction decoder further comprises an exception handling portion that is operable to store a copy of the program instructions being processed in the instruction decoder and the back-end processing engine.

5. The computer processor of claim 2, wherein the instruction decoder further comprises a look up table interface block that is operable to transfer logical values from a look up table memory to the at least one look up table.

6. The computer processor of claim 5, wherein the instruction decoder further comprises a look up table history block that is operable to prevent storage of the first set of logical values or the second set of logical values multiple times in the at least one look up table.

7. The computer processor of claim 1, further comprising a fetch engine coupled to the input of the instruction decoder that is operable to align the program instructions.

8. The computer processor of claim 1, wherein the reconfiguration engine is further operable to extract one or more micro-operations from the first program instruction or the second program instruction and store the one or more micro-operations in a micro-operation unit memory, the back-end processing engine operable to execute the one or more micro-operations.

9. The computer processor of claim 8, wherein the reconfiguration engine further comprises a static binary optimization portion that is operable to combine the one or more micro-operations from a plurality of the program instructions into a combined plurality of micro-operations, the instruction decoder being operable to execute the combined plurality of micro-operations through the back-end processing engine.

10. The computer processor of claim 2, wherein the at least one look up table is fabricated on the same monolithic semiconductor chip as the instruction decoder, the at least one look up table being a part of the instruction decoder.

11. The computer processor of claim 1, further comprising a processor front end coupled to the input and operable to align the first program instruction and second program instruction.

12. An instruction decoder comprising:
an input for receiving program instructions;
an output coupled to a back-end processing engine;
a fixed instruction decoding portion having a plurality of logic gates coupled between the input and the output; and
a plurality of random access memory elements coupled to the fixed instruction decoding portion;

wherein the instruction decoder is internal to a computer processor and is selectively operable to decode a plurality of first program instructions associated with a first instruction set architecture and a plurality of second program instructions associated with a second instruction set architecture using logical values stored in the plurality of random access memory elements, the logical values generated before execution of the computer processor by a reconfiguration engine that is separate from the computer processor, the logical values operable to allow the instruction decoder to alternatively decode the plurality of first program instructions through the same plurality of logic gates as the plurality of second program instructions, the logical values generated from:
    operational codes generated from the plurality of first program instructions and the plurality of second program instructions; and
    micro-operations generated from the generated operational codes; and
wherein the logical values are generated by:
    determining a plurality of opcodes from the plurality of first program instructions and the plurality of second program instructions;
    determining bit-locations of the determined plurality of opcodes;
    determining bit-lengths of the determined plurality of opcodes;
    composing a plurality of pseudo opcodes;
    determining a plurality of extended opcodes from the plurality of first program instructions and the plurality of second program instructions;
    determining extended opcode fields from the plurality of first program instructions and the plurality of second program instructions;
    determining bit-locations of the determined plurality of extended opcodes;
    determining bit-lengths of the determined plurality of extended opcodes;
    generating aligned opcodes using the plurality of pseudo opcodes, the determined bit-locations, and the determined bit-lengths; and
    generating the logical values using the determined extended opcodes and the aligned opcodes.

13. The instruction decoder of claim 12, wherein the plurality of random access memory elements is a portion of at least one look up table.

14. The instruction decoder of claim 13, wherein the at least one look up table comprises three look up tables and the fixed instruction decoding portion comprises an opcode extraction portion, an instruction identification portion, and an instruction transformation portion that are each associated with one of the three look up tables.

15. The instruction decoder of claim 14, wherein the instruction decoder further comprises an exception handling portion that is operable to store a copy of the program instructions being processed in the instruction decoder and the back-end processing engine.

16. The instruction decoder of claim 13, further comprising a look up table interface block that is operable to transfer logical values from a look up table memory to the at least one look up table.

17. The instruction decoder of claim 16, further comprising an instruction set architecture history block that is operable to prevent storage of the logical values multiple times in the at least one look up table.

18. The instruction decoder of claim 12, further comprising a fetch engine coupled to the input of the instruction decoder that is operable to align the program instructions.

19. The instruction decoder of claim 18, wherein the reconfiguration engine is further operable to extract one or more micro-operations from the plurality of first program instructions or the plurality of second program instructions and store the one or more micro-operations in a micro-operation unit memory, the back-end processing engine operable to execute the one or more micro-operations.

20. The instruction decoder of claim 19, wherein the reconfiguration engine further comprises a static binary optimization portion that is operable to combine the one or more micro-operations from a plurality of the program instructions into a combined plurality of micro-operations, the instruction decoder being operable to execute the combined plurality of micro-operations through the back-end processing engine.

21. A method comprising:
    generating, by a reconfiguration engine, a first set of logical values for decoding a first set of program instructions, the first set of logical values generated from a first set of operational codes generated from the first set of program instructions and a first set of micro-operations generated from the first set of operational codes, the first set of program instructions associated with a first instruction set architecture;
    generating, by the reconfiguration engine, a second set of logical values for decoding a second set of program instructions, the second set of logical values generated from a second set of operational codes generated from the second set of program instructions and a second set of micro-operations generated from the second set of operational codes, the second set of program instructions associated with a second instruction set architecture that is different from the first instruction set architecture;
    storing the first and second sets of logical values in a plurality of random access memory elements coupled to a fixed decoding portion of an instruction decoder, the instruction decoder being internal to a computer processor;
    receiving, by the instruction decoder, a first program instruction associated with the first instruction set architecture from an instruction memory;
    decoding, by the instruction decoder, the first program instruction by logically combining a particular one of the first set of logical values with the first program instruction to form a first decoded logic value associated with a target instruction set architecture, the first decoded logic value indicating a decoded output of the first program instruction;
    transmitting, by the instruction decoder, the first decoded logic value to a back-end processing engine coupled to the instruction decoder;
    receiving, by the instruction decoder, a second program instruction associated with the second instruction set architecture from an instruction memory;
    decoding, by the instruction decoder, the second program instruction by logically combining a particular one of the second set of logical values with the second program instruction to form a second decoded logic value associated with the target instruction set architecture, the second decoded logic value indicating a decoded output of the second program instruction; and
    transmitting, by the instruction decoder, the second decoded logic value to the back-end processing engine;

wherein the reconfiguration engine is separate from the computer processor and the first and second sets of logical values are generated before execution of the computer processor;
wherein the first and second sets of logical values are operable to allow the instruction decoder to alternatively decode the first program instruction from the first instruction set architecture and the second program instruction from the second instruction set architecture using a single physical path in the computer processor; and
wherein the first and second sets of logical values are generated by:
  determining a plurality of opcodes from the first and second sets of program instructions;
  determining bit-locations of the determined plurality of opcodes;
  determining bit-lengths of the determined plurality of opcodes;
  composing a plurality of pseudo opcodes;
  determining a plurality of extended opcodes from the first and second sets of program instructions;
  determining extended opcode fields from the first and second sets of program instructions;
  determining bit-locations of the determined plurality of extended opcodes;
  determining bit-lengths of the determined plurality of extended opcodes;
  generating aligned opcodes using the plurality of pseudo opcodes, the determined bit-locations, and the determined bit-lengths; and
  generating the first and second sets of logical values using the determined extended opcodes and the aligned opcodes.

22. The method of claim 21, wherein the plurality of random access memory elements forms a portion of at least one look up table.

23. The method of claim 21, and further comprising aligning the first program instruction and the second program instruction by a processor front end coupled to the input.

24. The method of claim 21, and further comprising extracting a micro-operation from the first program instruction or the second program instruction prior to receiving the first program instruction and the second program instruction, respectively and storing the micro-operation in a micro-operation unit coupled to the back-end processing engine.

25. The method of claim 21, combining a plurality of the first program instructions or a plurality of second program instructions into a single program instruction prior to receiving the first program instruction and the second program instruction, respectively.

26. Logic embodied in an electrical circuit, when executed being operable to:
store a first set of logical values for decoding a first set of program instructions in at least one look up table, the first set of program instructions being associated with a first instruction set architecture, the first set of logical values generated from:
  a first set of operational codes generated from the first set of program instructions; and
  a first set of micro-operations generated from the first set of operational codes;
receive a first program instruction associated with the first instruction set architecture from an instruction memory;
decode the first program instruction by logically combining a particular one of the first set of logical values with the first program instruction to form a first decoded logic value associated with a target instruction set architecture, the first decoded logic value indicating a decoded output of the first program instruction;
transmit the first decoded logic value to a back-end processing engine coupled to an instruction decoder;
store a second set of logical values for decoding a second set of program instructions in the at least one look up table, the second set of program instructions being associated with a second instruction set architecture, the second instruction set architecture being different from the first instruction set architecture, the second set of logical values generated from:
  a second set of operational codes generated from the second set of program instructions; and
  a second set of micro-operations generated from the second set of operational codes;
receive a second program instruction associated with the second instruction set architecture from an instruction memory;
decode the second program instruction by logically combining a particular one of the second set of logical values with the second program instruction to form a second decoded logic value associated with the target instruction set architecture, the second decoded logic value indicating a decoded output of the second program instruction; and
transmit the second decoded logic value to the back-end processing engine;
wherein the first and second sets of logical values are generated before execution of the logic by a reconfiguration engine that is separate from the electrical circuit;
wherein the first and second sets of logical values are operable to allow the logic to alternatively decode the first program instruction from the first instruction set architecture and the second program instruction from the second instruction set architecture using a single physical path in the electrical circuit; and
wherein the first and second sets of logical values are generated by:
  determining a plurality of opcodes from the first and second sets of program instructions;
  determining bit-locations of the determined plurality of opcodes;
  determining bit-lengths of the determined plurality of opcodes;
  composing a plurality of pseudo opcodes;
  determining a plurality of extended opcodes from the first and second sets of program instructions;
  determining extended opcode fields from the first and second sets of program instructions;
  determining bit-locations of the determined plurality of extended opcodes;
  determining bit-lengths of the determined plurality of extended opcodes;
  generating aligned opcodes using the plurality of pseudo opcodes, the determined bit-locations, and the determined bit-lengths; and
  generating the first and second sets of logical values using the determined extended opcodes and the aligned opcodes.

27. The logic of claim 26, wherein the at least one look up table comprises three look up tables and the instruction decoder comprises a fixed decoding portion, the fixed decoding portion comprising an opcode extraction portion, an instruction identification portion, and an instruction transformation portion that are each associated with one of the three look up tables.

28. The logic of claim 27, wherein the instruction decoder further comprises an exception handling portion that is operable to store a copy of the first program instruction or the second program instruction being processed in the instruction decoder and the back-end processing engine.

29. The logic of claim 26, wherein the back-end processing engine is a processing engine selected from the group consisting of a single reduced instruction set computer, a complex instruction set computer, a superscalar processor, a very long instruction word processor including hardware accelerators in field-programmable gate arrays and/or application-specific integrated circuits, and a homogeneous multi-processor system-on-a-chip, and a heterogeneous multi-processor system-on-a-chip.

\* \* \* \* \*

UNITED STATES PATENT AND TRADEMARK OFFICE
CERTIFICATE OF CORRECTION

PATENT NO. : 7,941,641 B1
APPLICATION NO. : 11/865624
DATED : May 10, 2011
INVENTOR(S) : Yong-Kyu Jung It is certified that error appears in the above-identified patent and that said Letters Patent is hereby corrected as shown below:

Formal Drawings, Delete Sheet 4 of 4 Fig. 6 - Substitute therefor attached Sheet 4 of 4, Figure 6.

Signed and Sealed this
Third Day of April, 2012

David J. Kappos
*Director of the United States Patent and Trademark Office*